(No Model.) 4 Sheets—Sheet 1.

M. P. GOFF.
APPARATUS FOR THE GENERATION OF GAS.

No. 504,303. Patented Aug. 29, 1893.

Witnesses:
J. F. Coleman
F. W. Keiner

Inventor
Matt P. Goff
By J. L. Fitzgerald
Att'y.

(No Model.) 4 Sheets—Sheet 2.

M. P. GOFF.
APPARATUS FOR THE GENERATION OF GAS.

No. 504,303. Patented Aug. 29, 1893.

Witnesses.

Inventor
Matt P. Goff
By J. C. Fitzgerald
Att'y (No Model.) 4 Sheets—Sheet 3.
M. P. GOFF.
APPARATUS FOR THE GENERATION OF GAS.
No. 504,303. Patented Aug. 29, 1893.
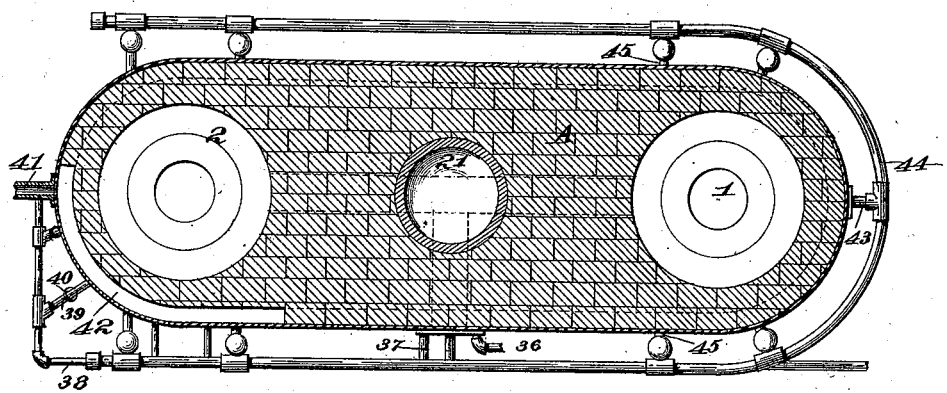
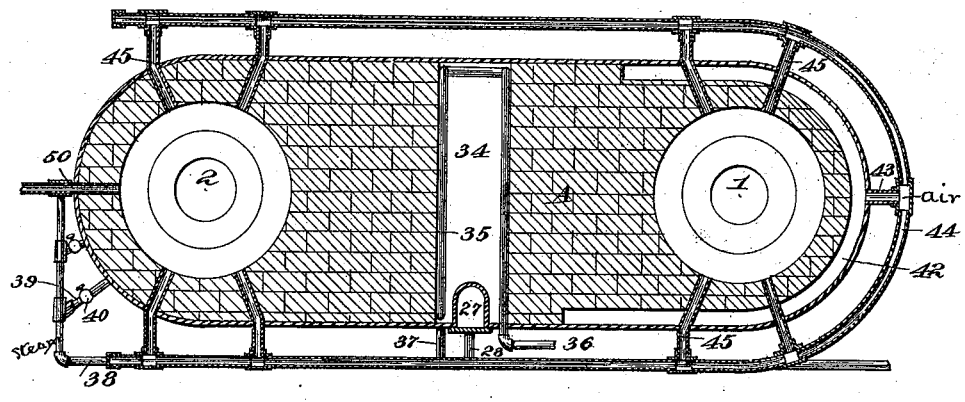
Witnesses. Inventor (No Model.) 4 Sheets—Sheet 4.
M. P. GOFF.
APPARATUS FOR THE GENERATION OF GAS.
No. 504,303. Patented Aug. 29, 1893.
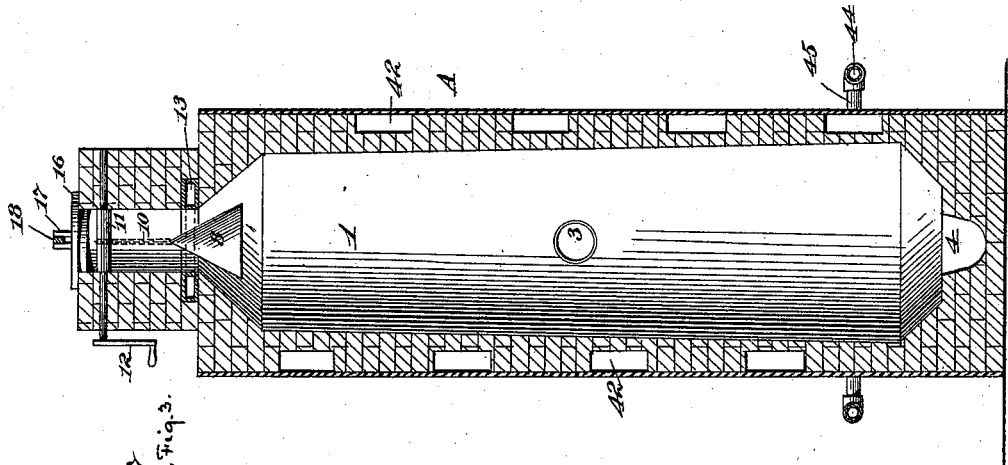
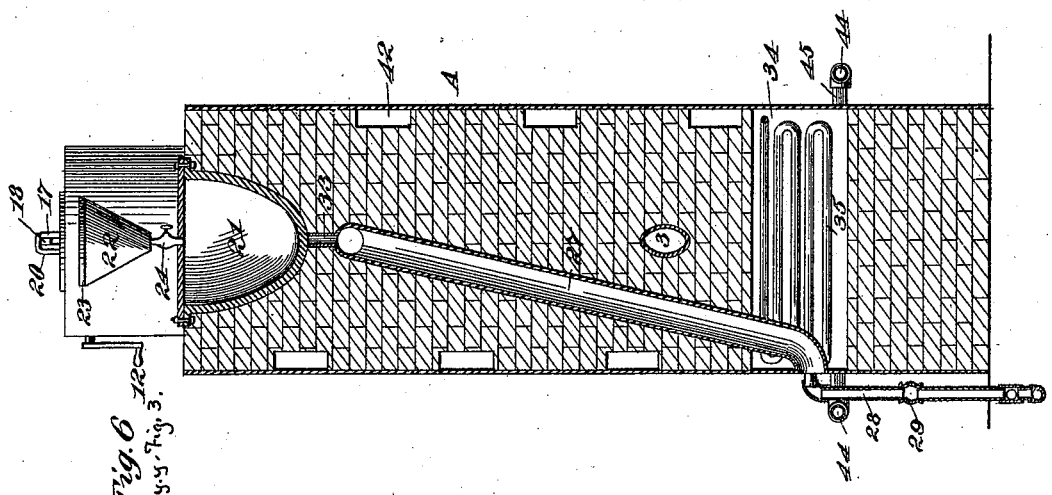
Witnesses.
Inventor
Mott P. Goff
By J. C. Fitzgerald
Att'y.

UNITED STATES PATENT OFFICE.

MOTT P. GOFF, OF MATTITUCK, NEW YORK, ASSIGNOR TO THE NATIONAL ELECTRIC GAS COMPANY, OF KENTUCKY.

APPARATUS FOR THE GENERATION OF GAS.

SPECIFICATION forming part of Letters Patent No. 504,303, dated August 29, 1893.

Application filed December 2, 1892. Serial No. 453,883. (No model.)

*To all whom it may concern:*

Be it known that I, MOTT P. GOFF, a citizen of the United States, residing at Mattituck, in the county of Suffolk, State of New York, have invented certain new and useful Improvements in Apparatus for the Generation of Gas for Illuminating and Fuel Purposes; and I do hereby declare the following to be a full, clear, and exact description of the invention, such as will enable others skilled in the art to which it appertains to make and use the same.

My invention relates to an apparatus for the generation of gas for illuminating and fuel purposes.

The invention will first be described in connection with the accompanying drawings, and then pointed out in the claims.

Figure 1:
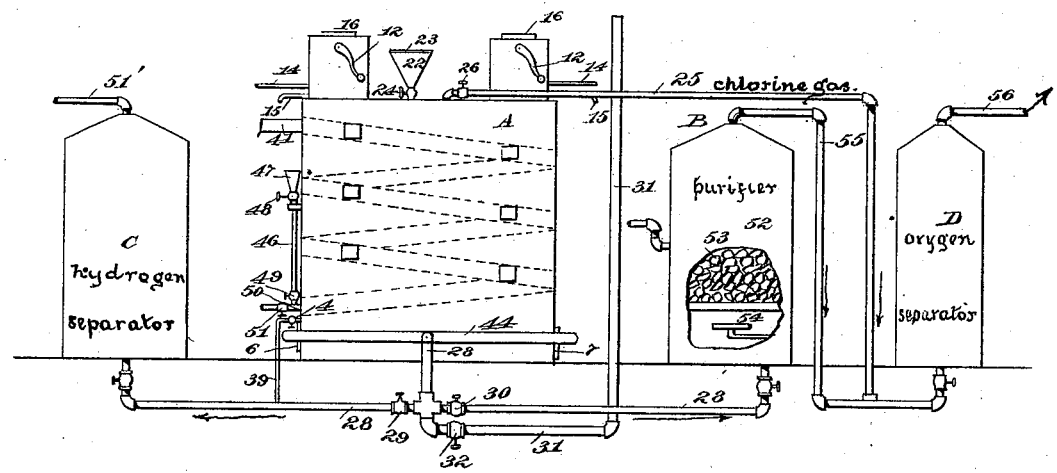
Figure 2:
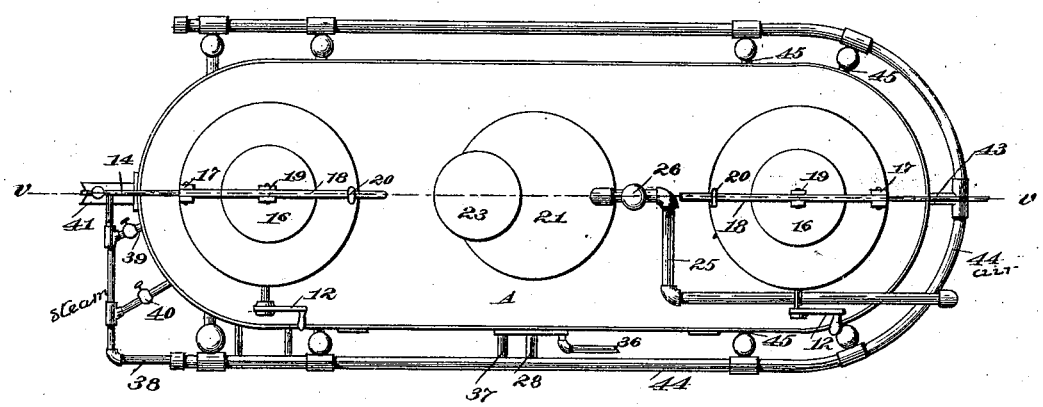
Figure 3:
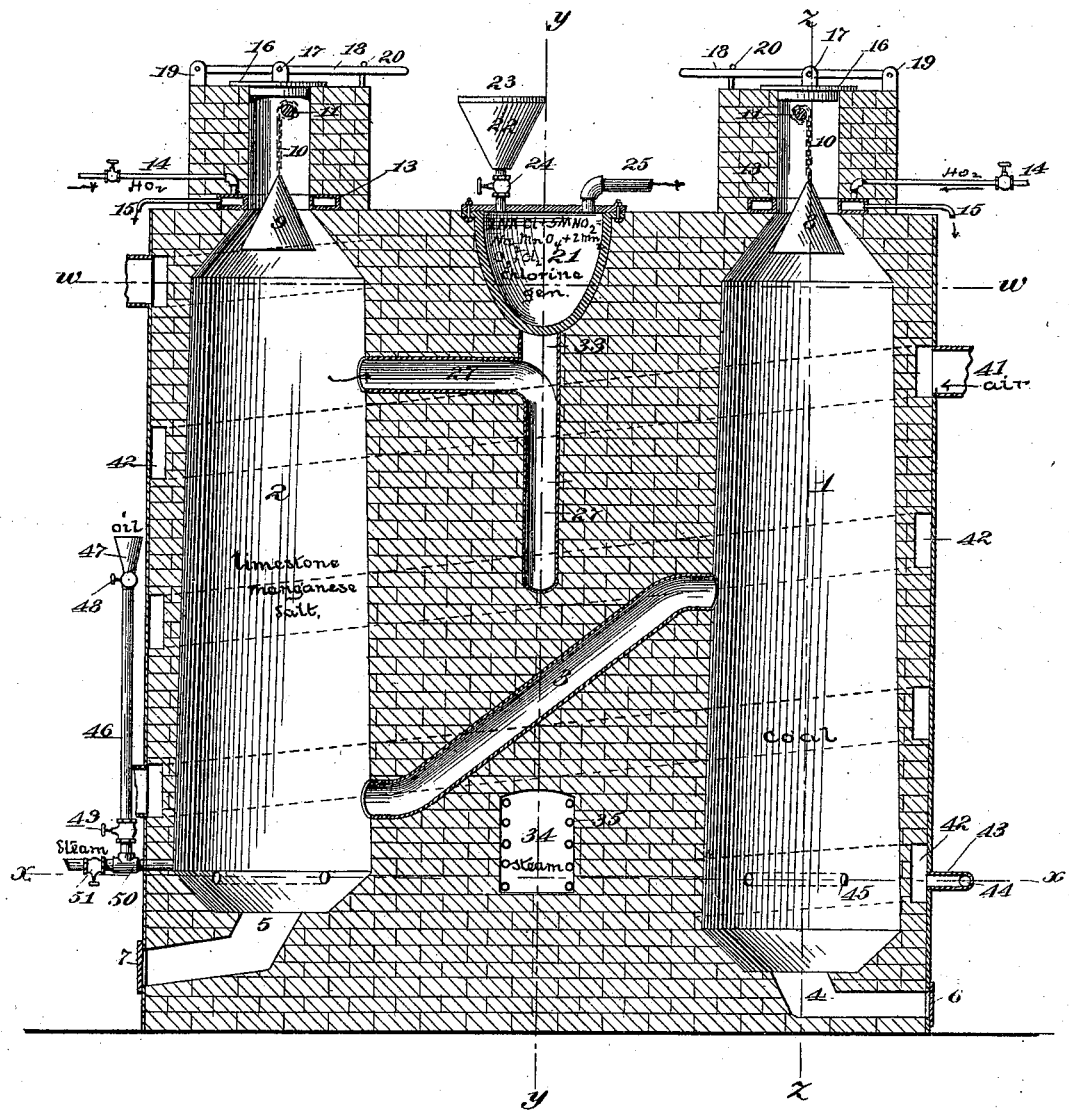

In the drawings, Figure 1 is a side elevation of the complete apparatus. Fig. 2 is a plan view of the generator. Fig. 3 is a longitudinal vertical sectional view of the generator on the line $v\,v$, Fig. 2. Fig. 4 is a horizontal section on the line $w\,w$, Fig. 3. Fig. 5 is a horizontal section on the line $x\,x$, Fig. 3. Fig. 6 is a cross-section on the line $y\,y$, Fig. 3. Fig. 7 is a similar view on the line $z\,z$, Fig. 3.

Referring to the drawings, A is a generator having a coal chamber 1 and a limestone chamber 2, connected by a flue 3, which extends from the middle of one side of the coal-chamber to near the bottom of the limestone-chamber, as shown. Chambers 1 and 2 are provided at their bottoms with chutes 4 and 5, respectively, having doors 6 and 7 adapted to be sealed by luting or otherwise.

In the tops of the chambers are cones 8 and 9, adapted to be raised and lowered by means of chains 10 and windlasses 11, provided with suitable hand cranks 12. Around the mouths of the chambers 1 and 2 are hollow collars 13, provided with water inlets 14 and outlets 15, whereby a continual circulation of water may be kept up within the collars to prevent them from becoming too hot, it being understood that the water inlets are to be connected with any suitable source of water supply. The cones 8 and 9 are adapted to engage with these collars when raised by the windlasses, thereby closing the mouths of the chambers 1 and 2.

The top of each chamber is provided with a lid 16, hinged at 17 to lever 18, which is pivoted at 19 and provided with any suitable catch as at 20. On top of the generator, between the two chambers, is a chlorine retort 21, having a hopper 22, provided with a sealed lid 23 and a valve 24. This retort is connected with a separator D by means of a pipe 25, having a valve 26, as shown.

Extending from near the top of chamber 2, and downward and outward, is a flue 27 in communication with a distributing pipe 28, having valves 29 and 30 and connected at one end with a purifier B, the other end of said distributing pipe being connected to a hydrogen separator C, of any suitable construction. 31 is a blow off pipe, also in connection with the flue 27, and having a valve 32 as shown. At 33 the flue 27 is recessed on its upper side, permitting the hot gases to readily heat the chlorine retort.

Near the bottom of the generator A, between the chambers 1 and 2, is located a coil vault 34, containing a coil of steam pipe 35, having an inlet 36, and an outlet 37 in connection with a steam distributing pipe 38, having branches 39, which open into the interior of the limestone chamber 2, and are provided with valves, 40. The steam inlet pipe 36 is connected with any suitable source of steam supply.

A blower (not shown) is connected by a pipe 41, to an air flue 42, built into the outer walls of the generator, extending in a spiral manner downward and around both chambers 1 and 2, and connected at 43 with an external air-pipe 44 provided with tuyeres 45 which open into the coal chamber 1 near its bottom, as shown. The air flue is for the purpose of heating the air from the blower before it enters the coal-chamber, and it also tends to cool the exterior of the generator.

At one side of the generator is an oil tube 46, having at its top a funnel 47, provided with a valve 48. The lower end of the oil tube is provided with a valve 49, opening into a steam jet-pipe 50, which opens into the interior of the limestone chamber, and is connected to the steam distributing pipe by a valve 51.

The purifier B consists of a retort 52 filled with pieces of broken pumice stone 53 and is heated in any suitable way as by gas jets, as shown at 54. The purifier retort has an outlet pipe 55 which connects it with an oxygen separator D of any suitable construction, from which a pipe 56 leads to a suitable oxygen holder or tank, not shown. The hydrogen separator C also has a pipe 51' which leads to a hydrogen holder or tank, not shown.

The operation of my apparatus is as follows: The coal chamber 1 is charged with coal, and the limestone chamber 2 with limestone, binoxide of manganese and salt, in the proportions of twenty pounds of binoxide of manganese and twenty pounds of salt to each ton of stone. The chlorine retort is charged with salt and binoxide of manganese through the hopper 22 and valve 24. The purifier B is then fired up to heat the pumice stone to a red heat. Then a fire is started in the chute 4 at the bottom of the coal chamber 1 until the coal contained therein becomes ignited upon which event the door 6 is closed and the blower started to urge the combustion of the coal, the blow off valve 32 being opened and the valves 29 and 30 closed. When the limestone becomes heated to a sufficient extent, the blow off valve 32 is closed, valve 30 opened and the coal-chamber recharged, if necessary. The binoxide of manganese, together with the salt, under action of the heat in the limestone chamber, forms chlorine gas, besides evolving some free oxygen. These gases, with the products of combustion from the coal and the carbonic dioxide, or carbonic acid gas, from the lime (consisting in all of hydrogen, chlorine and carbonic dioxide) pass into and through the highly heated pumice stone in the purifier B, which decomposes the gases, this decomposition resulting in the decomposition of carbon, while a combination of oxygen and hydrogen gases escapes through the pipe 55 and enters the oxygen separator D, the water in which should be at a temperature of about 140° Fahrenheit. The chlorine gas, evolved from the binoxide of manganese and salt in the chlorine retort, is allowed to flow into the oxygen separator D by opening the valve 26. The chlorine gas unites with the hydrogen gas coming from the purifier B thus permitting the pure oxygen gas to go on to the tank or holder through the pipe 56. When sufficient oxygen has been generated, the valves 26 and 30 are closed, valve 29 opened and the products of distillation allowed to pass direct to the hydrogen separator, from whence it goes through all the usual purifying processes of washing, scrubbing, &c., and then is passed into a holder or reservoir. While the manufacture of this hydrogen gas is going on, superheated steam from the coil 35 in the coil vault is blown into the limestone-chamber through the valves 40. The steam on striking the red hot limestone becomes resolved into its component gases and unites with the products of distillation from the coal, thereby increasing the amount of gas. If a heavy hydrocarbon gas is required the oil tube 41 is charged with oil and the steam jet turned on to force the oil into the limestone chamber when it becomes vaporized and unites with the other gases, adding to their illuminating power.

Having thus fully described my invention, what I claim is—

1. In a gas generator, the combination with a coal chamber and a limestone chamber of a flue connecting the two chambers, a chlorine retort, and means for uniting the gases from the coal and limestone chambers with the chlorine gas from the chlorine retort, whereby the hydrogen is removed from said gases.

2. In a gas generating apparatus the combination with a coal chamber, a limestone chamber and a flue connecting both chambers, of a chlorine retort situated between the two chambers, a flue extending from near the top of the limestone chamber toward the bottom of the chlorine retort thence downward and outward, a pumice stone retort adapted to be heated by gas jets and connected to the downward extending flue and an oxygen separator connected to the pumice stone retort and to the chlorine retort, such as described.

3. In a gas generating apparatus, the combination, with a coal chamber, a limestone chamber, and a flue connecting both chambers, of a chlorine retort situated between the two chambers, a flue extending from near the top of the limestone chamber toward the bottom of the chlorine retort thence downward and outward, a pumice-stone retort adapted to be heated by gas-jets and connected to the downward-extending flue, an oxygen separator connected to the pumice-stone retort and to the chlorine retort, and an oil tube and steam-jet opening into the interior of the limestone chamber, substantially as described and for the purpose set forth.

In testimony whereof I affix my signature in presence of two witnesses.

MOTT P. GOFF.

Witnesses:
DAVID B. GERRETT,
PATRICK S. WARD.